(12) United States Patent
Kim et al.

(10) Patent No.: US 10,216,229 B2
(45) Date of Patent: Feb. 26, 2019

(54) METHOD OF MANUFACTURING FLEXIBLE DISPLAY APPARATUS

(71) Applicant: Samsung Display Co., Ltd., Yongin-si, Gyeonggi-do (KR)

(72) Inventors: Gunmo Kim, Yongin-si (KR); Wonsang Park, Yongin-si (KR); Jongsung Bae, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/402,771

(22) Filed: Jan. 10, 2017

(65) Prior Publication Data

US 2017/0199548 A1    Jul. 13, 2017

(30) Foreign Application Priority Data

Jan. 11, 2016    (KR) .................. 10-2016-0003342

(51) Int. Cl.
*B30B 3/00* (2006.01)
*G06F 1/16* (2006.01)
*B29C 65/00* (2006.01)

(52) U.S. Cl.
CPC .......... *G06F 1/1652* (2013.01); *B29C 66/814* (2013.01); *B30B 3/005* (2013.01); *B29C 66/81* (2013.01); *B30B 3/00* (2013.01)

(58) Field of Classification Search
CPC ..... G06F 1/1652; B29C 66/814; B29C 66/81; B30B 3/00; B30B 3/005; B30B 3/02
USPC .......................... 156/581, 228, 580
See application file for complete search history.

(56) References Cited

U.S. PATENT DOCUMENTS

| | | | | |
|---|---|---|---|---|
| 2010/0024733 | A1* | 2/2010 | Soda | ...................... C03C 17/001 118/730 |
| 2012/0291512 | A1 | 11/2012 | Kang et al. | |
| 2014/0345791 | A1 | 11/2014 | Son et al. | |

FOREIGN PATENT DOCUMENTS

| | | | | |
|---|---|---|---|---|
| DE | 4018480 A1 * | 12/1991 | ......... | B29C 63/0004 |
| KR | 10-2006-0065575 | 6/2006 | | |
| KR | 10-2011-0070270 | 6/2011 | | |
| KR | 10-2011-0075724 | 7/2011 | | |
| KR | 10-1260297 | 5/2013 | | |
| KR | 10-2014-0139361 | 12/2014 | | |
| KR | 10-2015-0012593 | 2/2015 | | |
| KR | 10-2015-0048547 | 5/2015 | | |

OTHER PUBLICATIONS

English translation of KR101260297.*
English translation of KR20060065575.*
English translation of KR20110070270.*

(Continued)

*Primary Examiner* — Sonya M Sengupta
(74) *Attorney, Agent, or Firm* — Lewis Roca Rothgerber Christie LLP

(57) ABSTRACT

Provided is a method of manufacturing a flexible display apparatus. The method includes: arranging a film over a window having a three-dimensional curved surface shape, the film being flexible; arranging a plurality of pressure balls over the film; and pressing the plurality of pressure balls towards the window by using a pressure plate such that the film is closely adhered onto the window according to the three-dimensional curved surface shape of the window.

13 Claims, 8 Drawing Sheets

(56) References Cited

OTHER PUBLICATIONS

English translation of KR20110075724.*
English translation of KR20140139361.*
English translation of KR20150012593.*
English translation of KR20150048547.*
English translation of DE4018480.*

* cited by examiner

METHOD OF MANUFACTURING FLEXIBLE DISPLAY APPARATUS

CROSS-REFERENCE TO RELATED APPLICATION

This application claims priority to and the benefit of Korean Patent Application No. 10-2016-0003342, filed on Jan. 11, 2016, in the Korean Intellectual Property Office, the disclosure of which is incorporated herein in its entirety by reference.

BACKGROUND

1. Field

One or more embodiments relate to a method of manufacturing a flexible display apparatus having a complex three-dimensional curved surface.

2. Description of the Related Art

A display apparatus includes a display panel including a plurality of pixels and at which an image is formed, and a transparent window covering a display surface of the display panel. The window protects the display panel from external impact and scratches caused during use.

Diversity in designs of display devices that are used for various electronic devices such as a smartphone, a tablet PC, or a navigation device has recently increased. Thus, research into flexible display apparatuses having a curved window having a three-dimensional shape has been actively conducted to meet the demand for design diversity.

However, using a method of manufacturing a flexible display apparatus of the related art, it is difficult to manufacture a display apparatus having a complex three-dimensional curved surface.

SUMMARY

One or more embodiments include a method of manufacturing a flexible display apparatus including a display apparatus having a complex three-dimensional curved surface.

Additional aspects will be set forth in part in the description which follows and, in part, will be apparent from the description, or may be learned by practice of the presented embodiments.

According to one or more embodiments, a method of manufacturing a flexible display apparatus includes: arranging a film over a window having a three-dimensional curved surface shape, the film being flexible; arranging a plurality of pressure balls over the film; and pressing the plurality of pressure balls towards the window by using a pressure plate such that the film is adhered onto the window according to the three-dimensional curved surface shape of the window.

Each of the plurality of pressure balls may be disposed between the film and the pressure plate while contacting other adjacent pressure balls.

Only some of the plurality of pressure balls may contact the pressure plate.

The plurality of pressure balls may include first pressure balls, second pressure balls, and third pressure balls, and only the first pressure balls may contact the film, and only the second pressure balls may contact the pressure plate.

The plurality of pressure balls may have elastic properties.

The method may further include arranging a plurality of lower pressure balls below the window.

The pressing of the plurality of pressure balls may include pressing the plurality of pressure balls disposed over the window towards the window by using the pressure plate while pressing the plurality of lower pressure balls below the window towards the window by using a lower pressure plate.

The method may further include arranging a plurality of additional pressure balls between the plurality of pressure balls and the pressure plate.

The plurality of additional pressure balls may each have a greater diameter than the plurality of pressure balls.

The pressing of the plurality of pressure balls may include moving the pressure plate in a direction to rotate the plurality of additional pressure balls contacting the pressure plate.

The plurality of pressure balls may include a ferromagnetic material, and the plurality of additional balls may include a non-magnetic material.

A magnet may be disposed below the window.

The film may include a flexible display panel including a display element.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
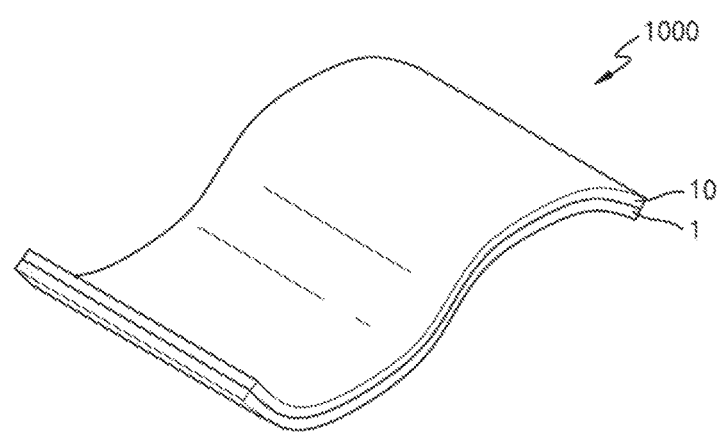
FIG. 1 is a schematic perspective view of a flexible display apparatus manufactured using a method of manufacturing a flexible display apparatus according to an embodiment of the inventive concept.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As the inventive concept allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. In the description of the inventive concept, certain detailed explanations of related art are omitted when it is deemed that they may unnecessarily obscure the essence of the inventive concept.

It will be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the spirit and scope of the present invention.

Spatially relative terms, such as "top," "bottom," "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the embodiments below, an x-axis, a y-axis, and a z-axis are not limited to three axes on a rectangular coordinates system but may be construed as including these axes. For example, an-x axis, a y-axis, and a z-axis may be at right angles or may also indicate different directions from one another, which are not at right angles.

The embodiments of the inventive concept will be described below in more detail with reference to the accompanying drawings. Those components that are the same or are in correspondence are rendered the same reference numeral regardless of the figure number, and redundant explanations may be omitted. In the drawings, thicknesses of several layers and areas are enlarged for clarity. Also, thicknesses of some layers and areas are exaggerated in the drawings for convenience of description.

Further, it will also be understood that when one element, component, region, layer, and/or section is referred to as being "between" two elements, components, regions, layers, and/or sections, it can be the only element, component, region, layer, and/or section between the two elements, components, regions, layers, and/or sections, or one or more intervening elements, components, regions, layers, and/or sections may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

It will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. Furthermore, "connection," "connected," etc., may also refer to "electrical connection," "electrically connected," etc., depending on the context in which such terms are used as would be understood by those skilled in the art. When an element or layer is referred to as being "directly on," "directly connected to," "directly coupled to," "directly connected with," "directly coupled with," or "immediately adjacent to" another element or layer, there are no intervening elements or layers present.

As used herein, "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Features described in relation to one or more embodiments of the present invention are available for use in conjunction with features of other embodiments of the present invention. For example, features described in a first embodiment may be combined with features described in a second embodiment to form a third embodiment, even though the third embodiment may not be specifically described herein.

FIG. 1 is a schematic perspective view of a flexible display apparatus 1000 manufactured using a method of manufacturing a flexible display apparatus according to an embodiment of the inventive concept.

Referring to FIG. 1, the flexible display apparatus 1000 includes a film 10 (e.g., a flexible film 10) disposed over a window 1. The film 10 is closely adhered to the window 1 to have a shape corresponding to a shape of the window 1.

The film 10 may be a flexible display panel including a display element or may be functional layers such as an adhesive layer, a reinforcement layer, a polarization layer, or a touch panel layer. In addition, the film 10 may also have a stacked structure including the flexible display panel and the functional layers.

The window 1 may have a three-dimensional curved surface. A three-dimensional curved surface may refer to not only a sphere, a conical shape, or a cylindrical shape but also a shape having a partially curved surface having various curvatures. The window 1 covers the display panel to protect the display panel from external impact, scratches caused during use, and/or the like.

The window 1 having a three-dimensional curved surface may be formed in advance before disposing (e.g., arranging)

the film 10 over the window 1. Accordingly, the window 1 may function as a mold for molding the film 10 such that the film 10 corresponds to the shape of the window 1.

Figure 2:
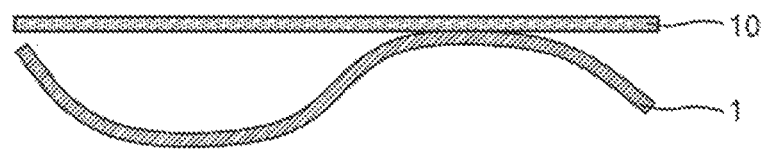
FIG. 2 is a schematic cross-sectional view illustrating a manufacturing process of a flexible display apparatus according to an embodiment of the inventive concept.
Figure 3:
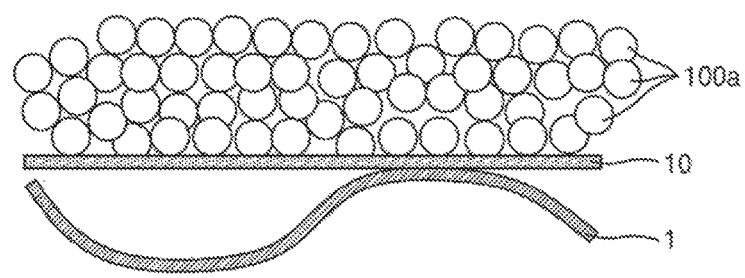
FIG. 3 is a schematic cross-sectional view illustrating a manufacturing process of a flexible display apparatus according to an embodiment of the inventive concept.
Figure 4:
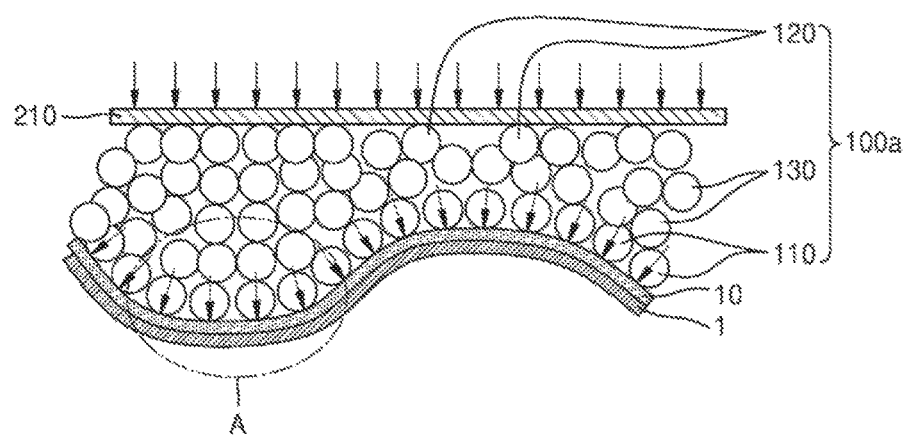
FIG. 4 is a schematic cross-sectional view illustrating a manufacturing process of a flexible display apparatus according to an embodiment of the inventive concept.
Figure 5:
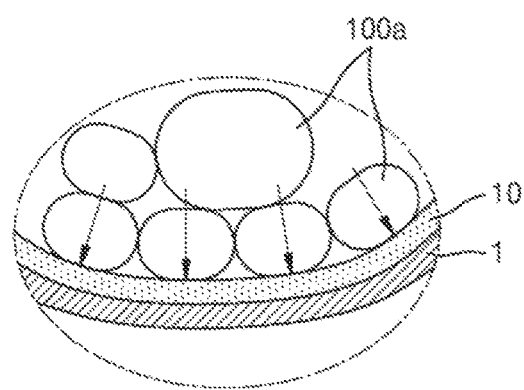
FIG. 5 is a cross-sectional view of a portion A illustrated in FIG. 4.

FIG. 2 is a schematic cross-sectional view illustrating manufacturing process of a flexible display apparatus according to an embodiment of the inventive concept. FIG. 3 is a schematic cross-sectional view illustrating manufacturing process of a flexible display apparatus according to an embodiment of the inventive concept. FIG. 4 is a schematic cross-sectional view illustrating manufacturing process of a flexible display apparatus according to an embodiment of the inventive concept. FIG. 5 is an extended cross-sectional view of a portion A illustrated in FIG. 4.

First, as illustrated in FIG. 2, a film 10 (e.g., a flexible film 10) is disposed over a window 1. The window 1 having a three-dimensional curved surface (e.g., a predetermined three-dimensional curved surface) may be formed in advance as described above.

The film 10 has flexible properties. The film 10 may have a planar shape, and may be closely adhered to the window 1 later and deformed to have a three-dimensional curved surface. However, the film 10 is not limited thereto, and may also be previously formed in a three-dimensional curved surface shape according to the shape of the window 1. In this case, a processing force required for deformation of the film 10 may be reduced, and thus, the film 10 may be laminated on the window 1 more easily.

Next, as illustrated in FIGS. 3 and 4, after disposing a plurality of pressure balls 100a on the film 10, the plurality of pressure balls 100a are pressed using a pressure plate 210. The pressure plate 210 may be disposed over the plurality of pressure balls 100a.

The pressure balls 100a fill space between the pressure plate 210 and the film 10. Each of the pressure balls 100a is disposed in the space between the pressure plate 210 and the film 10 while contacting other adjacent pressure balls.

In addition, the pressure balls 100a may be stacked in the space between the pressure plate 210 and the film 10. As illustrated in FIG. 4, the plurality of pressure balls 100a may include first pressure balls 110, second pressure balls 120, and third pressure balls 130. The first pressure balls 110 are located in a lowermost layer of the space between the pressure plate 210 and the film 10; the second pressure balls 120 are located in an uppermost layer of the space between the pressure plate 210 and the film 10; and the third pressure balls 130 are located in the remaining space between the pressure plate 210 and the film 10 besides the lowermost layer and the uppermost layer of the space. Thus, only the first pressure balls 110 contact the film 10, and only the second pressure balls 120 contact the pressure plate 210. The third pressure balls 130 act as a medium that transfers a pressure received by the second pressure balls 120 contacting the pressure plate 210, to the first pressure balls 110.

As the plurality of pressure balls 100a are stacked as described above, the film 10 does not directly receive a pressure from the pressure plate 210. Accordingly, excessive deformation of or damage to the film 10 due to an instantaneous large pressure applied to local portions of the film 10 may be prevented or reduced. In particular, when the film 10 is a flexible display panel, high external impact may cause serious damage to a display element and/or the like inside the display panel, and thus, it may be dangerous to the display element and/or the like when the film 10 is in direct contact with the pressure plate 210 to be pressed. In addition, as only some of the plurality of pressure balls 100a contact the pressure plate 210, damage to the pressure balls 100a may also be reduced or minimized.

In addition, the plurality of first pressure balls 110 contact the film 10 to press the film 10, and thus, a pressure may be uniformly applied to an upper surface of the film 10 in a perpendicular direction to the upper surface of the film 10. Accordingly, the film 10 may be effectively closely adhered to the window 1 having a three-dimensional curved surface of various suitable radii of curvature. Thus, the film 10 having a complex shape may be relatively easily formed, and a high lamination quality may be obtained by increasing an adhesive force between the film 10 and the window 1.

The plurality of pressure balls 100a may be elastic. When the pressure balls 100a have elastic properties, as illustrated in FIG. 5, the pressure balls 100a contacting the upper surface of the film 10 may be squashed due to a pressure from the pressure plate 210. When the pressure balls 100a are squashed, a contact area between the film 10 and the pressure balls 100a may be increased, and accordingly, the pressure balls 100a press the film 10 while rubbing the film 10. Due to this rubbing, molding and lamination of the film 10 may be performed quickly and precisely. In addition, when being pressed by the pressure plate 210, the pressure balls 100a may be easily deformed, and when pressing of the pressure plate 210 is released, the pressure balls 100a return to their original state, and thus, a lifetime of the pressure balls 100a may also be increased.

The pressure plate 210 may have a planar shape as illustrated in FIG. 3, but is not limited thereto. That is, the pressure plate 210 may have a roller form or have the same or a similar curved surface as that of the window 1. The pressure plate 210 may be disposed over the entire surface of the window 1 or over a partially curved surface of the window 1 to press the window 1 while moving along the entire surface of the window 1. The pressure plate 210 may move towards the window 1 or in a direction away from the window 1, and an additional driver may be connected to the pressure plate 210 to drive the pressure plate 210. The driver may include, for example, a hydraulic cylinder to uniformly press the entire surface of the pressure plate 210.

An additional mold or support may be disposed over a lower surface of the window 1. The mold or the support may be formed of an elastic material in order to prevent or reduce damage to the window 1 due to a pressure of the pressure plate 210.

According to the above-described processes, the flexible display apparatus 1000 including the film 10 disposed over the window 1 may be formed as illustrated in FIG. 1.

Hereinafter, a manufacturing process of the flexible display apparatus 1000 according to other embodiments of the inventive concept will be described with reference to FIGS. 6 and 7.

Figure 6:
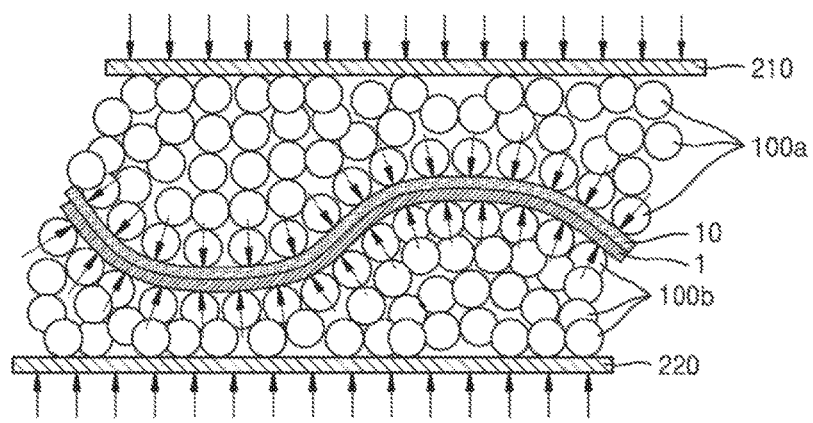
FIG. 6 is a schematic cross-sectional view of a manufacturing process of a flexible display apparatus according to another embodiment of the inventive concept.

FIG. 6 is a schematic cross-sectional view of a manufacturing process of a flexible display apparatus according to another embodiment of the inventive concept. FIG. 7 is a schematic cross-sectional view of a manufacturing process of a flexible display apparatus according to another embodiment of the inventive concept.

First, referring to FIG. 6, in addition to pressure balls 100a over the window 1, a plurality of lower pressure balls 100b may be further disposed below the window 1.

A lower pressure plate 220 is disposed under the lower pressure balls 100b. Thus, the lower pressure balls 100b are pressed using the lower pressure plate 220 in the same or a similar manner as that in which the pressure balls 100a disposed over the window 1 are pressed, and transfer a pressure to a lower surface of the window 1.

The plurality of pressure balls 100a and the plurality of lower pressure balls 100b arranged respectively over and below the window 1 may be concurrently (e.g., simultaneously) pressed to laminate the film 10 over the window 1. That is, while the lower pressure balls 100b press the lower surface of the window 1 according to the lower pressure plate 220, the plurality of pressure balls 100a disposed over the window 1 press the upper surface of the film 10 according to the pressure plate 210. Accordingly, lamination is performed using a pressure that works from above and below the window 1.

The plurality of lower pressure balls 100b fill space between the lower pressure plate 220 and the window 1. Each of the lower pressure balls 100b is disposed in the space between the lower pressure plate 220 and the window 1 while contacting other adjacent pressure balls.

In addition, the lower pressure balls 100b may be stacked in space between the lower pressure plate 220 and the window 1. Thus, only pressure balls located in an uppermost layer of the space between the lower pressure plate 220 and the window 1 contact the window 1, and only pressure balls located in a lowermost layer of the space contact the lower pressure plate 220. Accordingly, a pressure generated by the lower pressure plate 220 passes each of the layer of the lower pressure balls 100b and is transferred to the window 1.

As described above, as the plurality of lower pressure balls 100b are stacked, the window 1 is not directly pressurized by the pressure plate 210. Accordingly, cracks in and damage to the window 1 during an operation of closely adhering the film 10 to the window 1 may be prevented or reduced. In addition, only some of the lower pressure balls 100b contact the lower pressure plate 220, and thus, damage to the lower pressure balls 100b may also be minimized.

In addition, as the lower pressure balls 100b contact the window 1 to press the window 1, a pressure may be uniformly applied to the lower surface of the window 1 in a direction perpendicular to the lower surface of the window 1. Also, as the pressure balls 100a press the film 10 above the window 1, and the lower pressure balls 100b press the window 1 below the window 1, the film 10 and the window 1 are closely adhered to each other from above and below. Accordingly, when lamination between the film 10 and the window 1 is performed, an adhesive force between the film 10 and the window 1 may be further increased, and damage to the window 1 may be prevented or reduced at the same time.

When the plurality of lower pressure balls 100b are disposed below the window 1, an additional mold or support supporting the lower surface of the window 1 may be omitted.

Similar to the plurality of pressure balls 100a, the plurality of lower pressure balls 100b may also have elastic properties. Thus, some of the lower pressure balls 100b contacting the lower surface of the window 1 press the window 1 while being in a squashed form and rubbing the window 1.

The lower pressure plate 220 may have a planar shape or other various suitable shapes like the pressure plate 210 disposed over the window 1, and may be disposed over the entire surface of the window 1 or over a partially curved surface of the window 1. When the lower pressure plate 220 is disposed over a partially curved surface of the window 1, the lower pressure plate 220 may press the window 1 while moving along the entire surface of the window 1.

Figure 7:
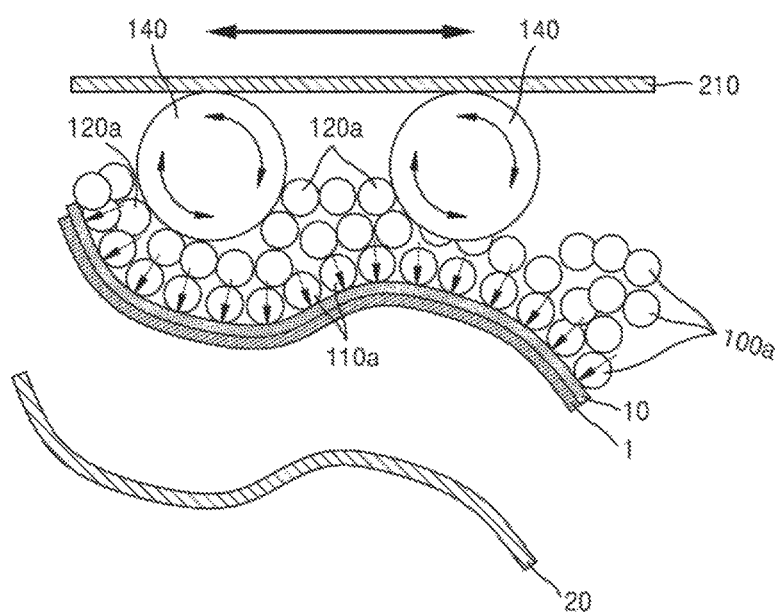
FIG. 7 is a schematic cross-sectional view of a manufacturing process of a flexible display apparatus according to another embodiment of the inventive concept.

Next, referring to FIG. 7, a plurality of additional pressure balls 140 may be disposed between the pressure balls 100a and the pressure plate 210. The plurality of additional pressure balls 140 may rotate.

The additional pressure balls 140 may be arranged on the plurality of pressure balls 100a so as to help the pressure balls 100a to easily press the film 10. That is, when the additional pressure balls 140 rotate, some of the pressure balls 100a contacting the additional pressure balls 140, that is, pressure balls 120a, also rotate. Then, a rotational force of the pressure balls 120a is also transferred to other adjacent pressure balls, and consequently, pressure balls 110a contacting an upper surface of the film 10 from among the pressure balls 100a are also rotated. As described above, as the pressure balls 110a contacting the upper surface of the film 10 press the film 10 while rotating, rubbing effects between the pressure balls 110a and the film 10 are increased to thereby further increase a quality and speed of lamination.

The additional pressure balls 140 may be rotated using various suitable methods. For example, the pressure plate 210 disposed over the additional pressure balls 140 may be moved in a direction to rotate the additional pressure balls 140 contacting the pressure plate 210. The direction along which the pressure plate 210 is moved may be a direction (e.g., a predetermined direction) that is parallel to a planar surface of the pressure plate 210. Accordingly, just by moving the pressure plate 210 in a direction, the additional pressure balls 140 may be rotated relatively easily. In addition, by moving the pressure plate 210 in a different direction from a previous direction, a rotational direction and a contacting aspect of the additional pressure balls 140 may be changed as desired.

The additional pressure balls 140 may have a greater diameter than the pressure balls 100a. Accordingly, the number of the pressure balls 100a contacting the additional pressure balls 140 may be increased, thereby quickly transferring a rotational force to the pressure balls 100a.

The shape of the additional pressure balls 140 is not limited to a ball shape, and may be any suitable shape as long as the shape allows easy rotation of the additional pressure balls 140. For example, the additional pressure balls 140 may have a cylindrical shape like a roller.

In order to effectively press the film 10 by using the additional pressure balls 140, a stacked structure of the pressure balls 100a is to be maintained, and a rotational force is to be transferred to many of the pressure balls 100a at the same or substantially the same time.

In order to meet the above requirement, for example, the pressure balls 100a may include a ferromagnetic material, and a magnet 20 may be disposed below the window 1. Accordingly, while being in a stacked structure, the pressure balls 100a may have a tendency of moving towards the window 1, and consequently, a pressure applied via the pressure balls 100a to the film 10 may be further increased. Here, the additional pressure balls 140 include a non-magnetic material so that the additional pressure balls 140 may be easily rotated using the pressure plate 210.

Alternatively, a total weight of the pressure balls 100a may be set to be greater than that of the additional pressure balls 140. Alternatively, like a method of using a magnetic force described above, an electrostatic force and/or the like may be generated so that the pressure balls 100a are pulled towards the window 1, thereby increasing a pressure applied by the pressure balls 100a to the film 10.

Although not illustrated in FIG. 7, in the same or a similar manner as that illustrated in FIG. 6, lower pressure balls and additional pressure balls may be disposed below the window 1 so as to concurrently (e.g., simultaneously) press the lower surface and the upper surface of the film 10 and the window 1.

As described above, according to the method of manufacturing a flexible display apparatus of the embodiment of the inventive concept, a display apparatus having a complex three-dimensional curved surface may be easily formed, and an adhesive force between the window 1 and the display apparatus may be increased.

Figure 8:
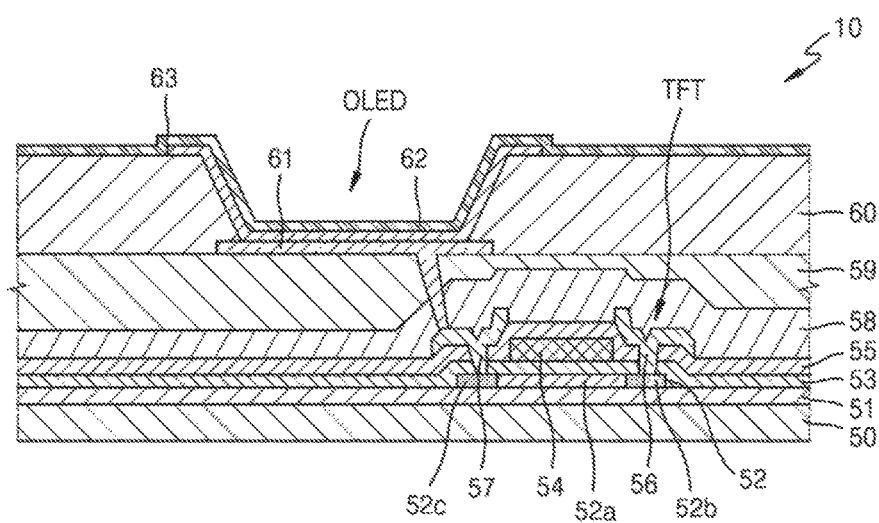
FIG. 8 is a schematic cross-sectional view of a film of FIG. 1 according to an embodiment of the inventive concept.

FIG. 8 is a schematic cross-sectional view of the film 10 of FIG. 1 according to an embodiment of the inventive concept.

As described above, the film 10 may be a flexible display panel. In this case, the flexible display panel may include a display element over a flexible substrate. Hereinafter, for convenience of description, a structure of a flexible display panel in which an organic light-emitting device is included as a display element will be described.

Referring to FIG. 8, various elements (or components) of the flexible display panel are formed on a substrate 50.

The substrate 50 may be a flexible substrate or a portion obtained after cutting the flexible substrate. The substrate 50 may be formed of a material for forming a flexible substrate, for example, an organic material such as polyimide, polyethylene naphthalate, polyethylene terephthalate, polyether ether ketone, polyethersulfone, polymethyl methacrylate, polycarbonate, or polypropylene. In some example embodiments, when polyimide which has heat resistance and flexibility is used, a transparent flexible substrate may be formed.

A common layer such as a buffer layer 51, a gate insulation layer 53, an interlayer insulation layer 55 and/or the like may be formed over the substrate 50, that is, over the entire surface of the substrate 50, and a patterned semiconductor layer 52 including a channel area 52a, a source contact area 52b, and a drain contact area 52c may be formed over the substrate 50, and in addition to the patterned semiconductor layer 52, elements (or components) of a thin film transistor TFT, that is, a gate electrode 54, a source electrode 56, and a drain electrode 57, may be formed over the substrate 50.

In addition, a protection layer 58 covering the thin film transistor TFT and a planarization layer 59 located on the protection layer 58 and having an approximately planar upper surface may be formed over the entire substrate 50. An organic light-emitting device (OLED) including a patterned pixel electrode 61, an opposite electrode 63 approximately corresponding to the entire surface of the substrate 50, and a multi-layer intermediate layer 62 interposed between the pixel electrode 61 and the opposite electrode 63 and including an emissive layer may be formed over the planarization layer 59.

Unlike FIG. 8, some layers of the intermediate layer 62 may be a common layer approximately corresponding to the entire surface of the substrate 50, and some other layers of the intermediate layer 62 may be pattern layers patterned to correspond to the pixel electrode 61. The pixel electrode 61 may be electrically connected to the thin film transistor TFT via a via hole. Also, a pixel defining layer 60 covering edges of the pixel electrode 61 and having an aperture defining each of the pixel areas may be formed over the planarization layer 59 to approximately correspond to the entire surface of the substrate 50.

According to one or more embodiments of the inventive concept as described above, a method of manufacturing a flexible display apparatus may be provided, in which a display apparatus having a complex three-dimensional curved surface is easily formed, and also, an adhesive force between a window and the display apparatus is increased. However, the scope of the inventive concept is not limited by the above effects.

It should be understood that the embodiments described herein should be considered in a descriptive sense only and not for purposes of limitation. Descriptions of features or aspects within each of the embodiments should typically be considered as being available for other similar features or aspects in other embodiments.

While one or more embodiments have been described with reference to the figures, it will be understood by those of ordinary skill in the art that various changes in form and details may be made therein without departing from the spirit and scope of the present invention as defined by the following claims and their equivalents.

What is claimed is:

1. A method of manufacturing a flexible display apparatus, the method comprising:
   arranging a film over a window, the window comprising a three-dimensional curved surface shape, the film being flexible;
   arranging a plurality of pressure balls over the film; and
   pressing the plurality of pressure balls towards the window with a pressure using a pressure plate such that the film is adhered onto the window according to the three-dimensional curved surface shape of the window,
   wherein the plurality of pressure balls comprises first pressure balls and second pressure balls stacked over the first pressure balls along a direction from the window to the pressure plate, and
   the second pressure balls are configured to transfer the pressure of the pressing to the first pressure balls.

2. The method of claim 1, wherein each of the plurality of pressure balls is between the film and the pressure plate while contacting other adjacent pressure balls.

3. The method of claim 1, wherein only some of the plurality of pressure balls contact the pressure plate.

4. The method of claim 1,
   wherein the plurality of pressure balls further comprises third pressure balls,
   wherein only the first pressure balls contact the film, and
   wherein only the second pressure balls contact the pressure plate.

5. The method of claim 1, wherein the plurality of pressure balls have elastic properties, and
   wherein the plurality of pressure balls are configured to be deformed by the pressure.

6. The method of claim 1, further comprising arranging a plurality of lower pressure balls below the window.

7. The method of claim 6, wherein the pressing of the plurality of pressure balls comprises pressing the plurality of pressure balls over the window towards the window using the pressure plate while pressing the plurality of lower pressure balls below the window towards the window using a lower pressure plate.

8. The method of claim 1, further comprising arranging a plurality of additional pressure balls between the plurality of pressure balls and the pressure plate, the plurality of additional pressure balls are separated from the film by the plurality of pressure balls.

9. The method of claim 8, wherein the plurality of additional pressure balls each have a greater diameter than the plurality of pressure balls.

10. The method of claim 8, wherein the pressing of the plurality of pressure balls comprises moving the pressure plate in a direction to rotate the plurality of additional pressure balls contacting the pressure plate.

11. The method of claim 8, wherein the plurality of pressure balls comprises a ferromagnetic material, and the plurality of additional pressure balls comprise a non-magnetic material.

12. The method of claim 11, wherein a magnet is below the window.

13. The method of claim 1, wherein the film comprises a flexible display panel comprising a display element.

* * * * *